US012626585B2

(12) United States Patent
Ochi

(10) Patent No.: US 12,626,585 B2
(45) Date of Patent: May 12, 2026

(54) ELECTRONIC DEVICE AND CONTROL METHOD

(71) Applicant: Panasonic Intellectual Property Management Co., Ltd., Osaka (JP)

(72) Inventor: Makoto Ochi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/887,671

(22) Filed: Sep. 17, 2024

(65) Prior Publication Data

US 2025/0014455 A1 Jan. 9, 2025

Related U.S. Application Data

(63) Continuation of application No. PCT/JP2023/012444, filed on Mar. 28, 2023.

(30) Foreign Application Priority Data

May 9, 2022 (JP) ................................ 2022-077113

(51) Int. Cl.
*G08C 17/02* (2006.01)

(52) U.S. Cl.
CPC .................................. *G08C 17/02* (2013.01)

(58) Field of Classification Search
CPC ......... G08C 17/02; G06F 21/35; G06F 21/44; G06F 21/45; G06F 21/31; G06F 21/575;
(Continued)

(56) References Cited

U.S. PATENT DOCUMENTS

| | | | | |
|---|---|---|---|---|
| 6,400,941 B1 * | 6/2002 | Nara | ........................ | H04W 4/02 455/552.1 |
| 8,812,829 B2 | 8/2014 | Nimura et al. | | |

(Continued)

FOREIGN PATENT DOCUMENTS

| | | |
|---|---|---|
| JP | 2006-127293 | 5/2006 |
| JP | 2012-8800 | 1/2012 |

(Continued)

OTHER PUBLICATIONS

International Search Report issued in International Application No. PCT/JP2023/012444 on Jun. 6, 2023, with English translation.

(Continued)

*Primary Examiner* — Adnan Aziz
(74) *Attorney, Agent, or Firm* — Wenderoth, Lind & Ponack, L.L.P.

(57) ABSTRACT

An electronic device performing short-range wireless communication with an information processing terminal, includes: a processor; a storage storing a program executed by the processor; and a communicator communicating with the information processing terminal by short-range wireless communication. The communicator receives place determination information indicative of a place where the information processing terminal lies. The processor determines whether the communicator is in short-range wireless communication with the information processing terminal, determines whether the information processing terminal is at a registered place registered in advance, based on the place determination information, and changes control of the program based on results of the determinations.

6 Claims, 6 Drawing Sheets

(58) Field of Classification Search
CPC ... G06F 21/445; G06F 21/6218; H04L 63/108
See application file for complete search history.

(56) References Cited

U.S. PATENT DOCUMENTS

| | | | | |
|---|---|---|---|---|
| 11,062,031 | B2 | 7/2021 | Aizawa | |
| 2006/0095389 | A1 | 5/2006 | Hirota et al. | |
| 2010/0317371 | A1* | 12/2010 | Westerinen | H04M 1/72451 455/456.6 |
| 2011/0295971 | A1* | 12/2011 | Takagi | H04N 21/4223 709/217 |
| 2011/0320801 | A1 | 12/2011 | Nimura et al. | |
| 2012/0019674 | A1* | 1/2012 | Ohnishi | G08C 17/00 348/207.1 |
| 2014/0173069 | A1* | 6/2014 | Kim | H04L 67/51 709/221 |
| 2017/0054727 | A1* | 2/2017 | Takemoto | H04L 63/0876 |
| 2017/0235958 | A1 | 8/2017 | Khosravi et al. | |
| 2018/0196495 | A1* | 7/2018 | Wang | G06F 21/35 |
| 2019/0114432 | A1* | 4/2019 | Tang | G06F 21/81 |
| 2019/0286824 | A1 | 9/2019 | Aizawa | |
| 2019/0394183 | A1* | 12/2019 | Ayatsuka | H04L 63/0853 |
| 2020/0236619 | A1* | 7/2020 | Baird | H04W 52/0209 |
| 2020/0275274 | A1* | 8/2020 | Kwon | H04W 4/80 |
| 2022/0164147 | A1* | 5/2022 | Yoshida | G06F 21/34 |

FOREIGN PATENT DOCUMENTS

| | | |
|---|---|---|
| JP | 2012-185566 | 9/2012 |
| JP | 2015-1972 | 1/2015 |
| JP | 2019-160210 | 9/2019 |

OTHER PUBLICATIONS

Notification of Reasons for Refusal issued on Sep. 30, 2025 in corresponding Japanese Patent Application No. 2022-077113, with English machine translation.

International Preliminary Report on Patentability issued in International Application No. PCT/JP2023/012444 on Nov. 21, 2024.

* cited by examiner

Fig. 2

| REGISTERED PLACE | REGISTERED POSITION |
|---|---|
| HOME | (X1, Y1) |
| WORKPLACE | (X2, Y2) |

ELECTRONIC DEVICE AND CONTROL METHOD

CROSS REFERENCE TO RELATED APPLICATION

This is a continuation application of International Application No. PCT/JP2023/012444, with an international filing date of Mar. 28, 2023, which claims priority of Japanese Patent Application No. 2022-077113 filed on May 9, 2022, the content of which is incorporated herein by reference.

BACKGROUND

Technical Field

The present disclosure relates to an electronic device and a control method thereof.

Background Art

JP20128800A discloses an information processing device capable of selecting a program to be started upon recovery from a suspended state, depending on the usage situation.

The information processing device described in JP20128800A includes a non-volatile storage, a reception unit, a selector, and a program determiner. The non-volatile storage stores a plurality of programs. The reception unit receives context information when power supply to a calculation unit is started. The selector selects one of the plurality of programs stored in the non-volatile storage, based on the context information received by the reception unit. The program determiner determines whether the one program selected by the selector is stored in a volatile storage.

When the program determiner determines that the one program is not stored in the volatile storage, the information processing device described in JP20128800A correlates data stored in the volatile storage with the one program stored in the non-volatile storage and saves it in the non-volatile storage, and reads the one program selected by the selector from the non-volatile storage into the volatile storage, for startup. When the program determiner determines that the one program is stored in the volatile storage, the information processing device described in JP20128800A starts up the one program stored in the volatile storage.

In recent years, there has been a demand for electronic devices and control methods that change program control in response to various environments.

SUMMARY

The present disclosure provides an electronic device and a control method thereof that change program control in response to various environments.

An electronic device according to an aspect of the present disclosure is an electronic device performing short-range wireless communication with an information processing terminal, including:

- a processor;
- a storage storing a program executed by the processor; and
- a communicator communicating with the information processing terminal by short-range wireless communication,

- the communicator receives place determination information indicative of a place where the information processing terminal lies,
- the processor determines whether the communicator is in short-range wireless communication with the information processing terminal,
- the processor determines whether the information processing terminal is at a registered place registered in advance, based on the place determination information, and
- the processor changes control of the program based on results of the determinations.

A control method according to another aspect of the present disclosure is a control method for controlling an electronic device performing short-range wireless communication with an information processing terminal, including:

- receiving, by a communicator of the electronic device, place determination information indicative of a place where the information processing terminal lies;
- determining, by a processor of the electronic device, whether the communicator is in short-range wireless communication with the information processing terminal;
- determining, by the processor of the electronic device, whether the information processing terminal is at a registered place registered in advance, based on the place determination information; and
- changing, by the processor of the electronic device, control of a program stored in a storage of the electronic device, based on results of the determinations.

According to the present disclosure, there can be provided an electronic device and a control method thereof that change program control in response to various environments.

BRIEF DESCRIPTION OF DRAWINGS

FIG. 2 shows an example of registered position information;

DETAILED DESCRIPTION

Background to the Disclosure

Figure 1:
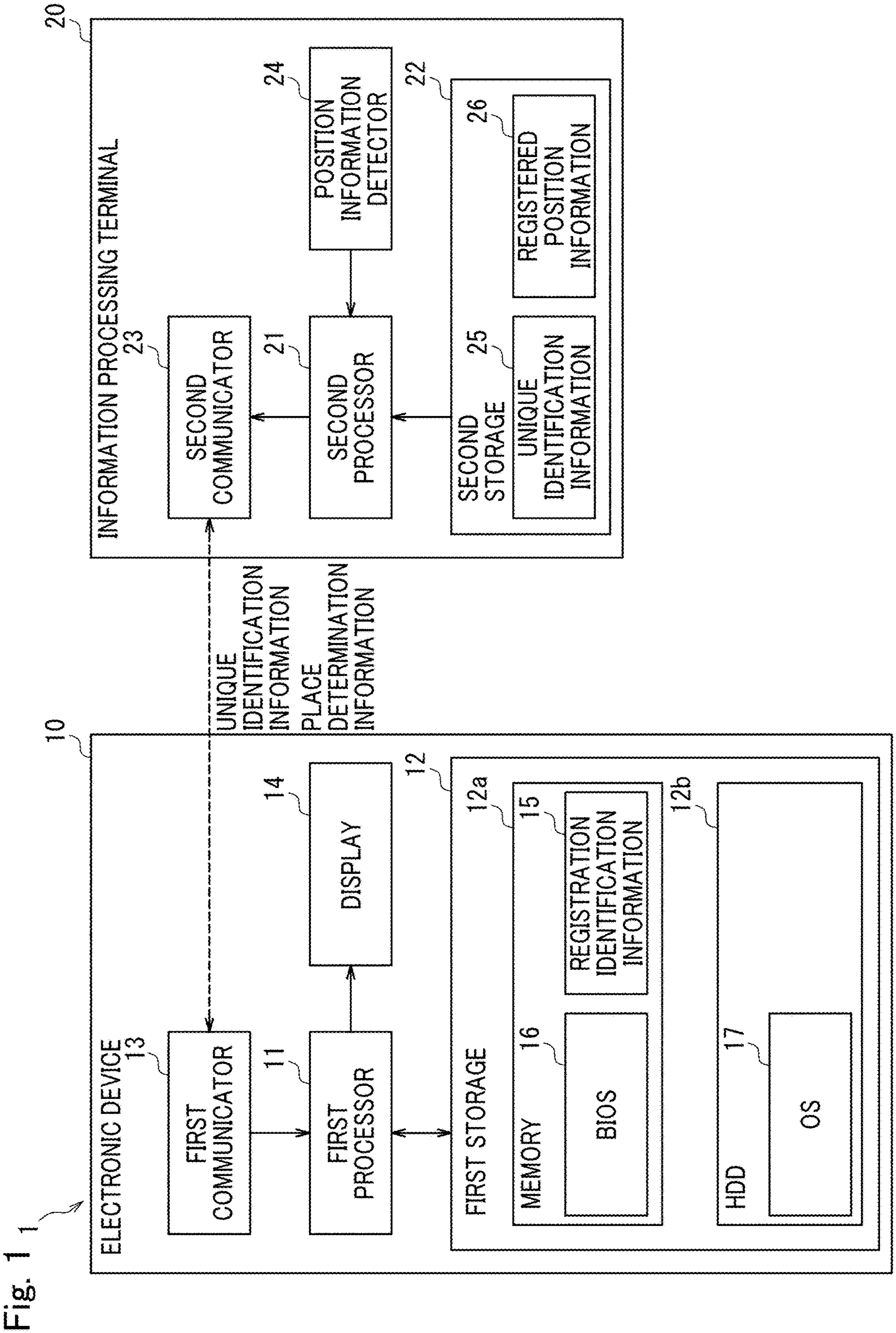
FIG. 1 is a schematic block diagram showing a configuration of a communication system according to a first embodiment of the present disclosure.

In recent years, with the spread of remote work, an increasing number of users are working using electronic devices at places other than the workplace, such as at home.

Depending on the place where a user works, security measures may not be sufficient. If an electronic device is used at such a place with insufficient security measures, there is a risk that highly confidential information, etc. may leak out to a third party. For example, due to unexpected theft or loss of the electronic device, information, etc. stored in the electronic device may leak out to a third party.

For this reason, from a security perspective, some companies have established security rules that prohibit handling of highly confidential information, etc. outside the workplace. In such cases, users are required to work at their workplaces when exchanging highly confidential information, which can lead to reduced productivity as teleworking is not possible.

In light of this background, it has been considered to enhance the security of electronic devices by combining information processing terminals, such as smartphones, with electronic devices. For example, an electronic device has been considered that does not require password entry when the information processing terminal is near the electronic device, but requires password entry when the information processing terminal is not near the electronic device. This prevents information from easily leaking out to a third party even if the electronic device is unexpectedly stolen or lost.

However, the above electronic device may not provide sufficient security measures. Depending on the place where the electronic device is used, highly confidential information, etc. may be viewed by a third party. For example, at a place where an unspecified number of people come and go, such as a cafe, there is a risk that a third party may view the information displayed on the screen of the electronic device on which the user is acting. Or, if the user works at a place where network security is not sufficient, information may leak out due to unauthorized access to the electronic device by a malicious third party.

In addition, there is an increasing demand to limit the use of electronic devices depending on the environment where the electronic devices are used.

Thus, the present inventors have conceived changing the control of the program of an electronic device in accordance with various environments and have arrived at the following disclosure.

Hereinafter, an embodiment of the present disclosure will be described with reference to the accompanying drawings. Note that the following description is merely illustrative in nature and is not intended to limit the present disclosure, its applications, or its uses. Furthermore, the drawings are schematic, and the proportion, etc. of dimensions do not necessarily correspond to the real ones.

As used herein, terms such as "first" and "second" are used for illustrative purposes only and should not be construed as explicitly expressing or implying the relative importance or ranking of technical features. Features limited as the "first" and "second" expressly or impliedly include one or more of the features.

First Embodiment (Overall Configuration)

FIG. 1 is a schematic block diagram showing a configuration of a communication system 1 according to a first embodiment of the present disclosure. As shown in FIG. 1, the communication system 1 includes an electronic device 10 and an information processing terminal 20. In the communication system 1, the electronic device 10 and the information processing terminal 20 perform short-range wireless communication. The short-range wireless communication means, for example, wireless communication within meters. For example, the short-range wireless communication may be wireless communication within 50 m, preferably wireless communication within 10 m, and more preferably wireless communication within 5 m.

<Electronic Device>

The electronic device 10 is, for example, a laptop PC. The electronic device 10 includes a first processor 11, a first storage 12, a first communicator 13, and a display 14.

The first processor 11 controls each component of the electronic device 10. The first processor 11 can be implemented by a semiconductor element or the like. The first processor 11 can be configured by a microcomputer, a CPU, an MPU, a GPU, a DSP, an FPGA, or an ASIC. The first processor 11 reads data and programs 16 and 17 stored in the first storage 12 to perform various arithmetic processes, to thereby implement predetermined functions.

The first storage 12 is a storage medium that stores programs 16 and 17 and data necessary to implement the functions of the electronic device 10. The first storage 12 includes a memory **12*a* and an HDD 12*b*. Examples of the memory 12*a* may include a RAM, a ROM, a PROM, an EPROM, a flash memory, or a combination thereof. The first storage 12 may include an SSD instead of the HDD 12*b*. Alternatively, the first storage 12 may include both the HDD 12*b*** and the SSD.

The memory **12*a* stores registration identification information 15 and a basic input output system (BIOS) 16. The registration identification information 15 is identification information of an information processing terminal 20 registered in advance. The electronic device 10 can identify the information processing terminal 20 based on the registration identification information 15. The memory 12*a* may store a unified extensible firmware interface (UEFI) instead of the BIOS 16**.

The HDD **12*b* stores an operating system (OS) 17. Examples of the OS 17** include various operating systems such as Microsoft (registered trademark) Windows (registered trademark) operating system or Linux (registered trademark).

The first communicator 13 includes a circuit that performs short-range wireless communication with the information processing terminal 20 in accordance with a predetermined communication standard. An example of the predetermined communication standard includes Bluetooth (registered trademark).

The display 14 is, for example, a display. The display 14 displays information of the electronic device 10. For example, the display 14 displays a screen of a program such as the BIOS 16 or the OS 17 executed by the first processor 11.

<Information Processing Terminal>

The information processing terminal 20 is a mobile terminal that can be carried by a user and can perform short-range wireless communication and position information detection. The information processing terminal 20 is, for example, a smartphone. The information processing terminal 20 includes a second processor 21, a second storage 22, a second communicator 23, and a position information detector 24.

The second processor 21 controls each component of the information processing terminal 20. The second processor 21 can be implemented by a semiconductor element or the like. The second processor 21 can be configured by a microcomputer, a CPU, an MPU, a GPU, a DSP, an FPGA, or an ASIC. The second processor 21 reads data and programs stored in the second storage 22 to perform various arithmetic processes, to thereby implement predetermined functions.

The second storage 22 is a storage medium that stores programs and data necessary to implement the functions of the information processing terminal 20. The second storage 22 can be implemented by, for example, a RAM, a ROM, a PROM, an EPROM, a flash memory, a HDD, an SSD, or a combination thereof.

The second storage 22 stores unique identification information 25 and registered position information 26. The unique identification information 25 is unique identification information for identifying the information processing terminal 20 and includes, for example, a serial number or a telephone number. The registered position information 26 contains a registered position indicative of a position registered in advance, and a registered place indicative of a place associated with the registered position.

As used herein, "position" means, for example, a coordinate point such as latitude and longitude, and "place" means a name that represents a position, which is named in relation to the position. A "place" may be, for example, an arbitrarily named name of home, workplace, or the like. A "place" may also be, for example, a name of land, facility, building, or the like. A "place" does not contain information that can identify a specific position.

FIG. 2 shows an example of the registered position information 26. In the example shown in FIG. 2, the registered position indicates a latitude and a longitude. For example, it is shown that "home" as a registered place is associated with a registered position (X1, Y1) and that "workplace" as a registered place is associated with a registered position (X2, Y2). X1 and X2 indicate latitudes, while Y1 and Y2 indicate longitudes.

A place other than the home and workplace and its position information may be registered in the registered position information 26. For example, the name of a place such as a coworking space or a spot office and position information indicative of the place may be registered in the registered position information 26.

The second communicator 23 includes a circuit that performs short-range wireless communication with the electronic device 10 in accordance with a predetermined communication standard. An example of the predetermined communication standard includes Bluetooth (registered trademark). The second communicator 23 performs short-range wireless communication with the first communicator 13 of the electronic device 10.

The position information detector 24 detects position information of the information processing terminal 20. The position information detector 24 is, for example, a sensor that detects a position such as a global positioning system (GPS).

(Operation)

Figure 3:
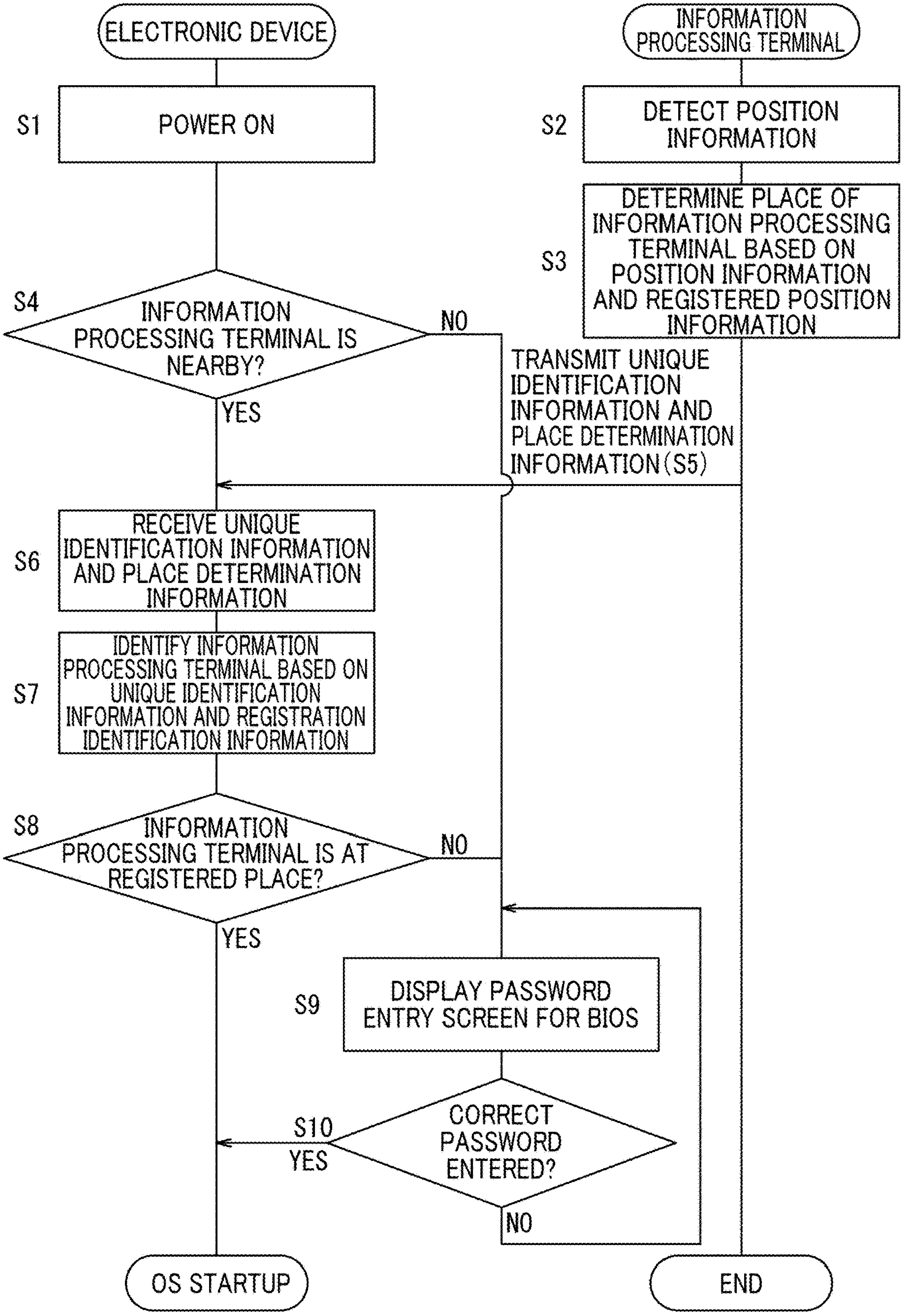
FIG. 3 is a control flowchart of the communication system according to the first embodiment of the present disclosure.

The operation of the communication system 1 according to the first embodiment of the present disclosure will be described with reference to FIG. 3. FIG. 3 shows a control flowchart of the communication system 1 according to the first embodiment of the present disclosure. Note that FIG. 3 shows the control of the electronic device 10 and the control of the information processing terminal 20.

As shown in FIG. 3, at step S1, the electronic device 10 is powered on. For example, the electronic device 10 is powered on based on a control signal input by a user. When the electronic device 10 is powered on, the first processor 11 reads out the BIOS 16 from the memory 12*a* of the first storage 12 to start it up.

At step S2, the information processing terminal 20 detects position information. For example, the position information detector 24 detects information on latitude and longitude as the position information of the information processing terminal 20.

At step S3, the information processing terminal 20 determines a place of the information processing terminal 20, based on the detected position information and the registered position information 26. For example, the second processor 21 receives the position information of the information processing terminal 20 from the position information detector 24. The second processor 21 reads out the registered position information 26 stored in the second storage 22. The second processor 21 searches for the position information detected by the position information detector 24 among the registered positions in the registered position information 26, to determine a place of the information processing terminal 20. That is, the second processor 21 determines whether the information processing terminal 20 is at a registered place that has been registered in advance, based on the detected position information and the registered position information 26.

For example, if the position information detected by the position information detector 24 is a position (X1, Y1), the second processor 21 searches for the position (X1, Y1) among the registered positions in the registered position information 26. As shown in FIG. 2, in the registered position information 26, the position (X1, Y1) is associated with "home" as a registered place. The second processor 21 thus determines that the information processing terminal 20 is at "home". In other words, the second processor 21 determines that the information processing terminal 20 is "at a registered place".

Alternatively, if the position information detected by the position information detector 24 is a position (X0, Y0), the position (X0, Y0) is not registered in the registered position information 26. In this case, the second processor 21 determines that the information processing terminal 20 is neither at "home" nor at "workplace". That is, the second processor 21 determines that the information processing terminal 20 is "not at either registered place".

When determining the place of the information processing terminal 20, the second processor 21 may determine whether the detected position information is within a predetermined range from a registered position, i.e., latitude and longitude, previously registered of the registered position information 26. As an example, a case will be described where the detected position information is a position (X3, Y3). In the case where the detected position (X3, Y3) is within a predetermined range ($X1\pm\alpha$, $Y1\pm\beta$) from the registered position (X1, Y1) indicative of the place of the home in the registered position information 26, the second processor 21 may determine that the information processing terminal 20 is at "home". Any numerical values may be set for "$\alpha$" and "$\beta$".

Referring back to FIG. 3, at step S4, the electronic device 10 determines whether the information processing terminal 20 is near the electronic device 10. For example, the first processor 11 determines whether the first communicator 13 is performing short-range wireless communication with the second communicator 23 of the information processing terminal 20.

If the first communicator 13 and the second communicator 23 are performing short-range wireless communication with each other, the first processor 11 determines that the information processing terminal 20 is near the electronic device 10. If the first communicator 13 and the second communicator 23 are not performing short-range wireless communication with each other, the first processor 11 determines that the information processing terminal 20 is not near the electronic device 10.

At step S4, if it is determined that the information processing terminal 20 is near the electronic device 10, the process proceeds to step S6. If it is determined that the information processing terminal 20 is not near the electronic device 10, the process proceeds to step S9.

At step S5, the information processing terminal 20 transmits the unique identification information 25 and place determination information to the electronic device 10. The position determination information is information indicative of a place where the information processing terminal 20 lies. In this embodiment, the place determination information is information on the place of the information processing terminal 20 determined at step S3, and is, for example, flag information indicating that the information processing terminal 20 is "at a registered place" or "not at a registered place". The flag information does not contain information that can identify a specific position of the information processing terminal 20.

For example, the second processor 21 reads out the unique identification information 25 from the second storage 22 and transmits the unique identification information 25 via the second communicator 23 to the electronic device 10. The second processor 21 transmits the place determination information indicative of the place of the information processing terminal 20 determined at step S3, via the second communicator 23, to the electronic device 10.

The second communicator 23 performs short-range wireless communication such as Bluetooth (registered trademark) with the first communicator 13 of the electronic device 10 and transmits thereto the unique identification information 25 and the place determination information of the information processing terminal 20.

The second processor 21 may transmit the unique identification information 25 and the place determination information to the electronic device 10 based on whether the electronic device 10 is performing short-range wireless communication. For example, if the first communicator 13 of the electronic device 10 and the second communicator 23 are performing short-range wireless communication with each other, the second processor 21 may transmit the unique identification information 25 and the place determination information via the second communicator 23 to the electronic device 10. If the first communicator 13 of the electronic device 10 and the second communicator 23 are not performing short-range wireless communication with each other, the second processor 21 may not transmit the unique identification information 25 and the place determination information via the second communicator 23 to the electronic device 10.

At step S6, the electronic device 10 receives the unique identification information 25 and the place determination information transmitted from the information processing terminal 20. For example, the first processor 11 receives the unique identification information 25 and the place determination information via the first communicator 13.

At step S7, the electronic device 10 identifies the information processing terminal 20 based on the unique identification information 25 and the registration identification information 15. For example, the first processor 11 reads out the registration identification information 15 stored in the memory 12*a* of the first storage 12 and searches for the unique identification information 25 from the registration identification information 15. The first processor 11 thereby identifies the information processing terminal 20 that is performing the short-range wireless communication. In other words, the first processor 11 determines whether the information processing terminal 20 performing the short-range wireless communication is a registered terminal.

If the information processing terminal 20 is an unregistered terminal, the process may proceed to step S9.

At step S8, the electronic device 10 determines whether the information processing terminal 20 is at a registered place. For example, the first processor 11 determines whether the information processing terminal 20 is at a registered place based on the place determination information received at step S6.

In this embodiment, the place determination information is flag information indicative of whether the information processing terminal 20 is "at a registered place" or "not at a registered place". Hence, the first processor 11 can easily determine whether the information processing terminal 20 is at a registered place based on the place determination information.

At step S8, if it is determined that the information processing terminal 20 is not at either registered place, the process proceeds to step S9. If it is determined that the information processing terminal 20 is at a registered place, the OS is started up.

At step S9, the electronic device 10 displays on the display 14 a password entry screen for entering a password for the BIOS 16. The user enters a password on the password entry screen via an input interface.

At step S10, the electronic device 10 determines whether a correct password has been entered. For example, the first processor 11 determines whether the password entered on the password entry screen matches a preset password. Information on the preset password is stored in, for example, the memory 12*a* of the first storage 12.

At step S10, if it is determined that the correct password has been entered on the password entry screen, the OS is started up, whereas if it is determined that the correct password has not been entered on the password entry screen, the process returns to step S9.

(Effects)

According to the communication system 1 of the first embodiment, the following effects can be achieved.

In the communication system 1, the electronic device 10 determines whether to display a password entry screen that prompts the user to enter a password, based on (i) the result of the determination as to whether the information processing terminal 20 is near the electronic device 10, and (ii) the result of the determination as to whether the information processing terminal 20 is at a registered place that has been registered in advance. With such a configuration, the electronic device 10 can set whether to enter a password depending on various environments.

For example, when the information processing terminal 20 is not near the electronic device 10 or when the information processing terminal 20 is not at the registered place, the password entry screen is displayed on the display 14 of the electronic device 10. On the other hand, when the information processing terminal 20 is near the electronic device 10 and at the registered position, display of the password entry screen is omitted. As a result, for example, when the electronic device 10 is used at a place where the risk of information leakage is high, password entry is requested, and when the electronic device 10 is used at a place where the risk of information leakage is low, password entry can be omitted. Such a configuration makes it possible to enhance the security while improving the usability of the electronic device 10.

The control method for controlling the electronic device 10 can also achieve the same effects as those described above.

In this embodiment, the example has been described where the electronic device 10 is a laptop PC, this is not limitative. For example, the electronic device 10 may be a computer such as a desktop PC or a tablet PC.

In this embodiment, the example has been described where the electronic device 10 includes the display 14, this is not limitative. The display 14 may not be an essential component.

In this embodiment, the example has been described where the information processing terminal 20 is a smartphone, the present disclosure is not limited thereto. The information processing terminal 20 may be a mobile terminal having a short-range wireless communication function and a position information detection function. For example, the information processing terminal 20 may be a tablet PC.

In this embodiment, the example has been described where the information processing terminal 20 determines the place of the information processing terminal 20 based on the position information detected by the position information detector 24 and the registered position information 26, the present disclosure is not limited thereto. For example, the information processing terminal 20 may transmit the position information detected by the position information detector 24 directly to the electronic device 10. In this case, the electronic device 10 may determine the position of the information processing terminal 20 based on the position information. That is, step S3 shown in FIG. 3 may be performed by the electronic device 10.

In this embodiment, the example has been described where the information processing terminal 20 transmits the unique identification information 25 to the electronic device 10, the present disclosure is not limited thereto. For example, the information processing terminal 20 may not transmit the unique identification information 25 to the electronic device 10.

In this embodiment, the example has been described where the place determination information is flag information indicating "being at a registered place" or "not being at a registered place", but this is not limitative. For example, the place determination information may contain place identification information that identifies the place where the information processing terminal 20 lies. For example, the place identification information is information that can identify the place of "home", "workplace", "coworking space" or the like. In this case, the programs 16 and 17 of the electronic device 10 can individually be controlled depending on the identified place.

In this embodiment, as shown in FIG. 2, the example has been described where one registered position is associated with one registered place, but this is not limitative. For example, a predetermined range may be associated with one registered place.

Variants will hereinafter be described.

(First Variant)

Figure 4:
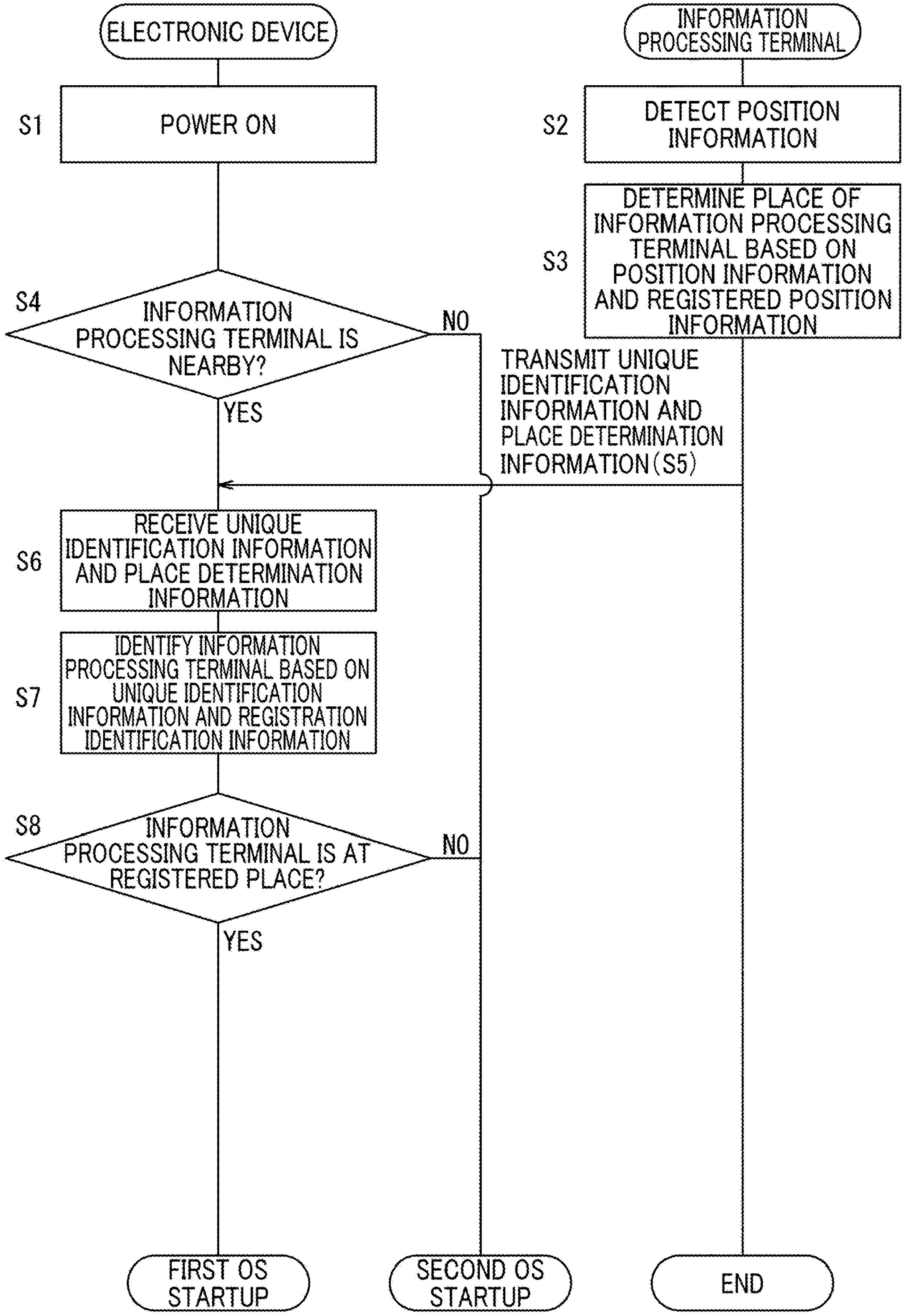
FIG. 4 is a control flowchart of a communication system of a first variant.

FIG. 4 is a control flowchart of a communication system of a first variant. As shown in FIG. 4, the control of electronic device 10 of the first variant differs from that of electronic device 10 of the first embodiment in that a plurality of OSs are switched. In the first variant, the differences from the first embodiment will mainly be described.

In the first variant, a first OS and a second OS are stored in the HDD **12*b* of the first storage 12**. For example, the first OS is Microsoft (registered trademark) Windows (registered trademark) operating system, and the second OS is Linux (registered trademark). The first OS and the second OS are not limited thereto. The first OS and the second OS need only be different.

In the first variant, if it is determined at step S8 that the information processing terminal 20 is at a registered place, the first OS is started up. On the other hand, if it is determined at step S4 that the information processing terminal 20 is not near the electronic device 10 or is not at a registered place, the second OS is started up.

In this way, the electronic device 10 can control whether to start up the first OS or the second OS based on the results of determination of steps S4 and S8. For example, the first OS can be started up when the user is using the electronic device 10 at a registered place such as a home or a workplace, while the second OS can be started up when the user is using the electronic device 10 at an unregistered place such as a cafe.

(Second Variant)

Figure 5:
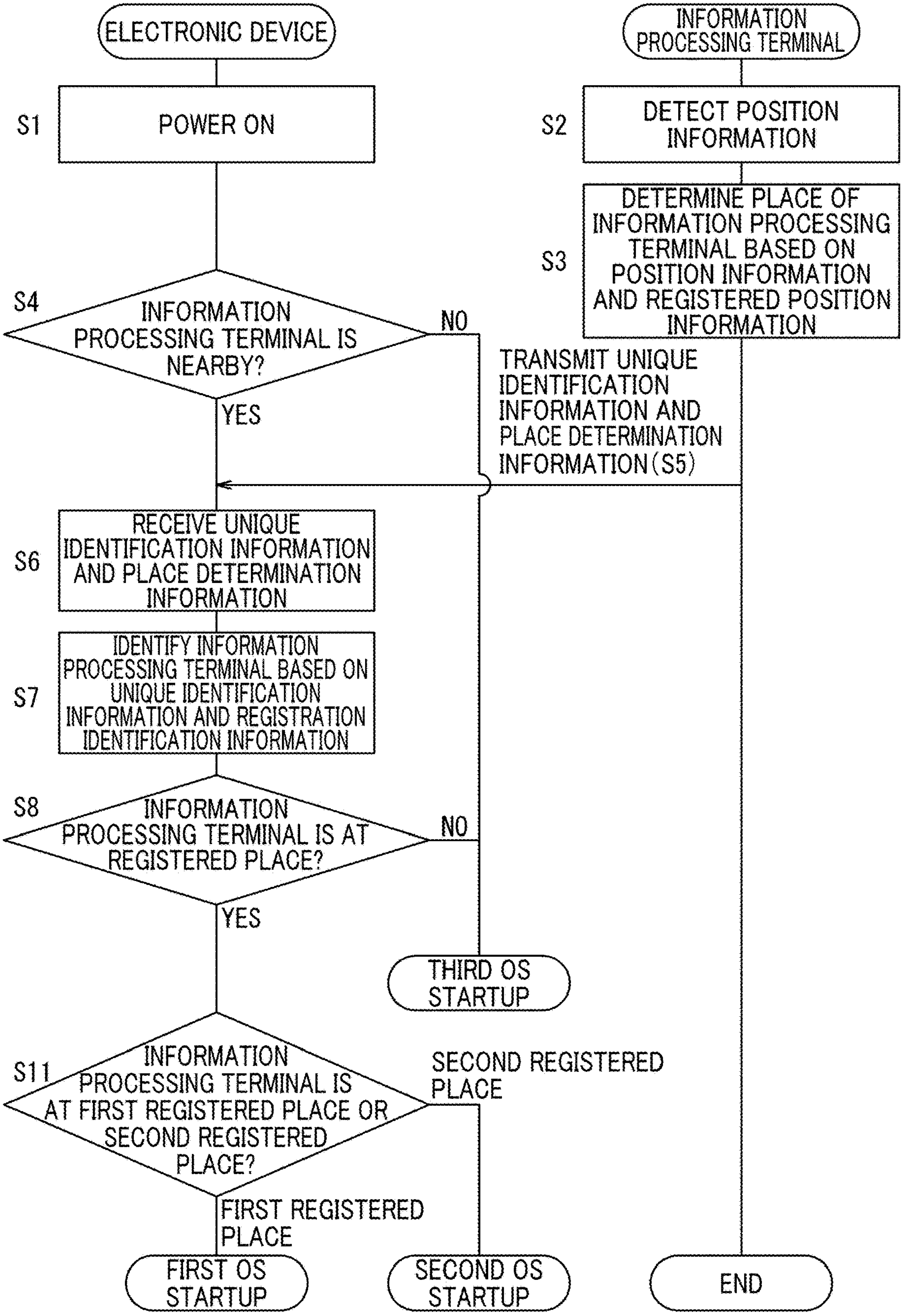
FIG. 5 is a control flowchart of a communication system of a second variant.

FIG. 5 is a control flowchart of a communication system of a second variant. As shown in FIG. 5, the control of the electronic device 10 of the second variant differs from the control of the electronic device 10 of the first variant in that a plurality of OSs are switched depending on the registered place. In the second variant, the differences from the first variant will mainly be described.

In the second variant, a first OS, a second OS, and a third OS are stored in the HDD **12*b* of the first storage 12**. The third OS may be the same OS as the first OS or the second OS, or may be an OS different from the first OS and the second OS.

The place determination information is place identification information that identifies a place where the information processing terminal 20 is present. For example, the place identification information is information that identifies a place such as home, workplace, or coworking space. In the second variant, it includes place identification information that indicates whether the information processing terminal 20 lies at a first registered place or a second registered place that has been registered in advance. For example, the first registered place may be "workplace" and the second registered place may be "home".

In the second variant, if it is determined at step S8 that the information processing terminal 20 is at a registered place, the process proceeds to step S11.

At step S11, the electronic device 10 determines, based on the place identification information, whether the information processing terminal 20 is at a first registered place that has been registered in advance, or at a second registered place that is different from the first registered place.

For example, if the place identification information indicates the first registered place and the information processing terminal 20 is determined to be at the first registered place, the first processor 11 reads out the first OS from the HDD **12*b* and starts it up. On the other hand, if the place identification information indicates the second registered place and the information processing terminal 20 is determined to be at the second registered place, the first processor 11 reads out the second OS from the HDD 12*b*** and starts it up.

If the place determination information indicates that the information processing terminal 20 is not at either registered place, the first processor 11 determines at step S8 that the information processing terminal 20 is not at either registered place. In this case, the first processor 11 reads out the third OS from the HDD **12*b*** and starts it up.

In the case where it is determined at step S4 that the information processing terminal 20 is not near the electronic device 10, the first processor 11 reads out the third OS from the HDD **12*b*** and starts it up.

In this way, the information processing terminal 20 may transmit to the electronic device 10 not only flag information indicative of "whether the information processing terminal 20 is at a registered place", but also place identification information by which a place such as home or workplace can be identified. The electronic device 10 can identify whether the information processing terminal 20 is at a home or at a workplace based on the place identification information, and can switch the OS used by the electronic device 10 depending on the place of the information processing terminal 20.

(Third Variant)

Figure 6:
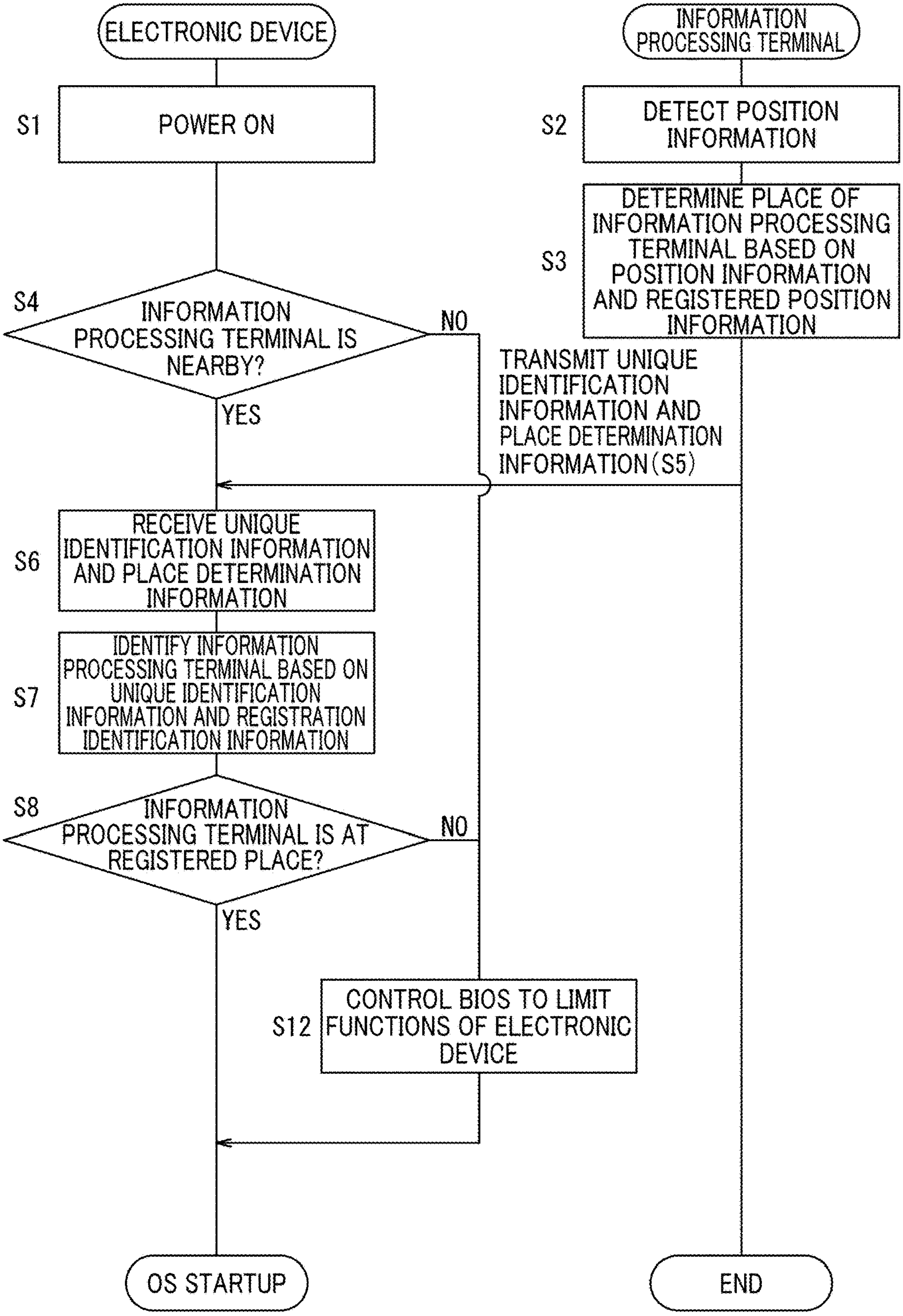
FIG. 6 is a control flowchart of a communication system of a third variant.

FIG. 6 is a control flowchart of a communication system of a third variant. As shown in FIG. 6, the control of the electronic device 10 of the third variant differs from the control of the electronic device 10 of the first embodiment 1 in that, if the information processing terminal 20 is not at a registered place, the BIOS 16 is controlled to limit the functions of the electronic device 10. In the third variant, the differences from the first embodiment will mainly be described.

In the third variant, the electronic device 10 includes at least one of a camera, a speaker, a microphone, a card slot or an input/output terminal. The card slot is a slot into which a recording medium such as an SD card is inserted for data write and read. The input/output terminal is a terminal allowing information input and output, such as a USB, an audio terminal, or a LAN terminal.

In the third variant, if it is determined at step S4 that the information processing terminal 20 is not near the electronic device 10, or if it is determined at step S8 that the information processing terminal 20 is not at either registered place, the process proceeds to step S12.

At step S12, the electronic device 10 controls the BIOS 16 to limit the functions of the electronic device 10. For example, the first processor 11 changes the settings of the BIOS 16 to limit the use of at least one of the camera, speaker, microphone, card slot or input/output terminal.

After step S12 is completed, the first processor 11 reads out the OS from the HDD 12*b* of the first storage 12 and starts it up.

The functions to be limited at step S12 are not limited to the camera, speaker, microphone, card slot or input/output terminals. The functions to be limited at step S12 may be any functions whose settings can be changed in the BIOS 16.

In the third variant, the example has been described where the BIOS 16 is controlled to limit the functions of the electronic device 10 when the information processing terminal 20 is not at either registered position, but the present disclosure is not limited thereto. For example, the BIOS 16 may be controlled depending on the place where the information processing terminal 20 lies to limit the functions of the electronic device 10. For example, if it is determined that the information processing terminal 20 is at home, the use of the camera, speaker, microphone, card slot or input/output terminal may be limited, and if it is determined that the information processing terminal 20 is at a coworking space, the use of the card slot or input/output terminal may be limited. In this way, even when the information processing terminal 20 is at a registered place, the functions of the electronic device 10 to be limited may be changed depending on the place.

As above, the above embodiments have been described as exemplification of techniques in the present disclosure. However, the technique in the present disclosure is not limited to this, various changes, permutations, additions, omissions, etc. may be made within the scope of claims or their equivalents.

Since the above embodiments are for the purpose of exemplifying the techniques in the present disclosure, various changes, permutations, additions, omissions, etc. may be made within the scope of claims or their equivalents.

The above embodiments may be implemented by apparatuses, systems, methods, computer programs, computer-readable storage mediums, and combinations thereof.

Summary of Embodiments (1) An electronic device performing short-range wireless communication with an information processing terminal, includes: a processor; a storage storing a program executed by the processor; and a communicator communicating with the information processing terminal by short-range wireless communication. The communicator receives place determination information indicative of a place where the information processing terminal lies. The processor determines whether the communicator is in short-range wireless communication with the information processing terminal. The processor determines whether the information processing terminal is at a registered place registered in advance, based on the place determination information. The processor changes control of the program based on results of the determinations.

(2) In the electronic device of (1), the storage may store registration identification information for identifying an information processing terminal registered in advance. The communicator may receive unique identification information for identifying the information processing terminal. The processor may identify the information processing terminal that is in short-range wireless communication with the communicator based on the unique identification information and the registration identification information.

(3) The electronic device of (1) or (2) may include a display. The program may include an operating system (OS) and a basic input output system (BIOS) or a unified extensible firmware interface (UEFI). The processor may start up the OS in response to determine that the communicator is in short-range wireless communication with the information processing terminal and that the information processing terminal is at the registered place. The processor may cause the display to display a password entry screen prompting the user to enter a password for the BIOS or the UEFI in response to determine that the communicator is not in short-range wireless communication with the information processing terminal or that the information processing terminal is not at the registered place.

(4) In the electronic device of (1) or (2), the program may include a first OS and a second OS different from the first OS. The processor may start up the first OS in response to determine that the communicator is in short-range wireless communication with the information processing terminal and that the information processing terminal is at the registered place. The processor may start up the second OS in response to determine that the communicator is not in short-range wireless communication with the information processing terminal or that the information processing terminal is not at the registered place.

(5) In the electronic device of (1) or (2), the program may include a first OS and a second OS different from the first OS. The processor may start up the first OS in response to determine that the communicator is in short-range wireless communication with the information processing terminal and that the information processing terminal is at a first registered place. The processor may start up the second OS in response to determine that the communicator is in short-range wireless communication with the information processing terminal and that the information processing terminal is at a second registered place different from the first registered place.

(6) In the electronic device of (1) or (2), the program may include a BIOS or a UEFI. The processor may control the BIOS or the UEFI to limit functions of the electronic device in response to determine that the communicator is not in short-range wireless communication with the information processing terminal or that the information processing terminal is not at the registered position.

(7) The electronic device of (6) may include at least one of a camera, a speaker, a microphone, a card slot or an input/output terminal. The processor may limit use of at least one of the camera, the speaker, the microphone, the card slot, or the input/output terminal in response to determine that the communicator is not in short-range wireless communication with the information processing terminal or that the information processing terminal is not at the registered place.

(8) In the electronic device of any one of (1) to (7), the information processing terminal may be a smartphone.

(9) A control method for controlling an electronic device performing short-range wireless communication with an information processing terminal, includes: receiving, by a communicator of the electronic device, place determination information indicative of a place where the information processing terminal lies; determining, by a processor of the electronic device, whether the communicator is in short-range wireless communication with the information processing terminal; determining, by the processor of the electronic device, whether the information processing terminal is at a registered place registered in advance, based on the place determination information; and changing, by the processor of the electronic device, control of a program stored in a storage of the electronic device, based on results of the determinations.

What is claimed is:

1. A communication system that includes an electronic device and an information processing terminal, the communication system comprising:

the information processing terminal registering in advance a registration position information associated with a registration place;

detecting a position information of the information processing terminal;

transmitting a flag information indicating whether or not the information processing terminal is at the registered place by short-range wireless communication, based on the position information and the registered position information; and the electronic device storing a first program and a second program;

receiving the flag information from the information processing terminal;

starting up the first program when the received flag information indicates that the information processing terminal is at the registration place; and starting up the second program when the received flag information indicates that the information processing terminal is not at the registration place, wherein the flag information does not contain information that can identify a specific position of the information processing terminal.

2. The communication system according to claim 1, wherein the electronic device includes;

a first processor;

a first storage storing the first program and the second program; and a first communicator performing short-range wireless communication with the information processing terminal;

the information processing terminal includes;

a second processor;

a second storage storing the position information of the registration place that is registered in advance as the registration position information;

a position information detector detecting the position information of the information processing terminal; and a first communicator performing short-range wireless communication with the electronic device;

wherein the second processor receives the position information of the information processing terminal from the position information detector, wherein the second processor determines whether or not the information processing terminal is at the registration place, based on the position information detected by the position information detector and the registration position information stored in the second storage, wherein the second processor transmits the flag information indicating whether or not the information processing terminal is at the registration place, to the electronic device via the second communicator, wherein the first processor receives the flag information from the information processing terminal via the first communicator, wherein the first processor starts up the first program stored in the first storage, when the received flag information indicates that the information processing terminal is at the registration place, and wherein the first processor starts up the second program stored in the first storage, when the received flag information indicates that the information processing terminal is not at the registration place.

3. The communication system according to claim 2, wherein the first storage stores a third program, wherein the registration place includes a first registration place and a second registration place, wherein the registration position information includes a first registration position and a second registration position, wherein the first registration position information is associated with the first registration position, wherein the second registration position information is associated with the second registration position, wherein the second processor generates the flag information indicating whether or not the information processing terminal is at the registration place, based on a determination result of the position information, wherein the second processor generates a place identification information indicating either the first registration place or the second registration place among registration places of the information processing terminal, based on the determination result of the position information, wherein the second processor transmits the flag information and the place identification information, to the electronic device via the second communicator, wherein the first processor receives the flag information and the place identification information, from the information processing terminal via the first communicator, wherein the first processor starts up the first program stored in the first storage, when the received flag information indicates that the information processing terminal is at the first registration place, wherein the first processor starts up the second program stored in the first storage, when the received flag information indicates that the information processing terminal is at the second registration place, and wherein the first processor starts up the third program stored in the first storage, when the received flag information indicates that the information processing terminal is not at the registration place and the registration place.

4. The communication system according to claim 1, wherein the registration place includes a first registration place and a second registration place, wherein the registration position information includes a first registration position and a second registration position, wherein the first registration position information is associated with the first registration position, wherein the second registration position information is associated with the second registration position, wherein the information processing terminal generates a place identification information indicating either the first registration place or the second registration place among registration places of the information processing terminal, based on the determination result of the position information, wherein the information processing terminal transmits the flag information and the place identification information, to the electronic device, wherein the electronic device stores the third program, wherein the electronic device receives the flag information and the place identification information, from the information processing terminal, wherein the electronic device starts up the first program, when the received flag information indicates that the information processing terminal is at the first registration place, wherein the electronic device starts up the second program, when the received flag information indicates that the information processing terminal is at the second registration place, and wherein the electronic device starts up the third program, when the received flag information indicates that the information processing terminal is not at the registration place.

5. A control method for controlling a communication system that includes an electronic device and an information processing terminal, comprising:

registering in the information processing terminal, a registration position information associated with a registration place in advance;

detecting by the information processing terminal, a position information of the information processing terminal;

transmitting from the information processing terminal to the electronic device, a flag information indicating whether or not the information processing terminal is at the registered place by short-range wireless communication, based on the position information and the registered position information;

storing in the electronic device, a first program and a second program;

receiving by the electronic device, the flag information from the information processing terminal;

starting up by the electronic device, the first program when the received flag information indicates that the information processing terminal is at the registration place; and starting up by the electronic device, the second program when the received flag information indicates that the information processing terminal is not at the registration place, wherein the flag information does not contain information that can identify a specific position of the information processing terminal.

6. The control method for controlling a communication system according to claim 5, wherein the registration place includes a first registration place and a second registration place, wherein the registration position information including a first registration position and a second registration position, wherein the first registration position information is associated with the first registration position, wherein the second registration position information is associated with the second registration position, the control method further comprising:

generating by the information processing terminal, the place identification information indicating either the first registration place or the second registration place among registration places of the information processing terminal, based on the determination result of the position information;

transmitting by the information processing terminal, the place identification information, to the electronic device;

storing in the electronic device, a third program;

receiving by the electronic device, the place identification information, from the information processing terminal;

starting up by the electronic device, the first program, when the received flag information indicates that the information processing terminal is at the first registration place;

starting up by the electronic device, the second program, when the received flag information indicates that the information processing terminal is at the second registration place; and starting up by the electronic device, the third program, when the received flag information indicates that the information processing terminal is not at the registration place.

* * * * *